US012198519B2

(12) United States Patent
Solomon et al.

(10) Patent No.: US 12,198,519 B2
(45) Date of Patent: Jan. 14, 2025

(54) SYSTEMS FOR DETECTING AND MONITORING A SMALL AREA WILDFIRE AND METHODS RELATED THERETO

(71) Applicant: Balloon Tech Co, San Francisco, CA (US)

(72) Inventors: David Solomon, San Francisco, CA (US); Daniel Patrick Bowen, San Francisco, CA (US)

(73) Assignee: Balloon Tech Co

( * ) Notice: Subject to any disclaimer, the term of this patent is extended or adjusted under 35 U.S.C. 154(b) by 0 days.

(21) Appl. No.: 17/968,891

(22) Filed: Oct. 19, 2022

(65) Prior Publication Data

US 2023/0123483 A1 Apr. 20, 2023

Related U.S. Application Data

(60) Provisional application No. 63/257,160, filed on Oct. 19, 2021.

(51) Int. Cl.

*G08B 17/00* (2006.01)
*G08B 17/12* (2006.01)
*G08B 25/10* (2006.01)
*G08B 25/14* (2006.01)

(52) U.S. Cl.

CPC ......... *G08B 17/005* (2013.01); *G08B 17/125* (2013.01); *G08B 25/10* (2013.01); *G08B 25/14* (2013.01)

(58) Field of Classification Search

CPC .... G08B 17/005; G08B 17/125; G08B 25/10; G08B 25/14; G08B 7/062; G08B 27/006

See application file for complete search history.

(56) References Cited

U.S. PATENT DOCUMENTS

2014/0027131 A1* 1/2014 Kawiecki ............ A62C 3/0228 169/53
2014/0244318 A1* 8/2014 Drake .................... G06Q 40/08 705/4
2018/0294870 A1* 10/2018 Van Wynsberghe .... H02J 50/27
2022/0129681 A1* 4/2022 Anand ................ A62C 3/0271

* cited by examiner

*Primary Examiner* — Joseph H Feild
*Assistant Examiner* — Sharmin Akhter
(74) *Attorney, Agent, or Firm* — EcoTech Law Group, P.C.

(57) ABSTRACT

A method of detecting a small area wildfire is described. The method includes: (i) receiving, at a processor, an electronic map of an area of interest; (ii) receiving, at the processor from a satellite, location information for a high-altitude balloon disposed above the area of interest; (iii) determining, using the processor and based one or more different types of sensor data that is received from one or more different types of sensors on the high-altitude balloon and the high-altitude balloon location, one or more wildfire locations; (iv) embedding each of the wildfire locations on the electronic map to produce a fire activity map; and (v) causing to display or displaying the fire activity map including the wildfire locations within the area of interest.

14 Claims, 7 Drawing Sheets

SYSTEMS FOR DETECTING AND MONITORING A SMALL AREA WILDFIRE AND METHODS RELATED THERETO

RELATED APPLICATION

This application claims priority from U.S. Provisional Application having Ser. No. 63/257,160, filed on Oct. 19, 2021, which is incorporated by reference for all purposes.

FIELD

The present teachings generally relate to novel systems and methods detecting small area wildfires. More particularly, the present teachings relate to inexpensive and easy-to-operate systems and methods for detecting small area wildfires using high-altitude balloons.

BACKGROUND

Wildfires generate substantial damage to ecosystems and infrastructure, require extensive resources and money to fight, and cause loss of life to humans, plants, and animals. Detecting a small area wildfire, before it grows to become a large wildfire, is imprecise, difficult, and costly.

What is needed, therefore, are systems and methods to easily, quickly, and cheaply detect and monitor small area wildfires before they grow into larger wildfires.

SUMMARY

To this end, the present arrangements and teachings provide improved systems for detecting and monitoring small area wildfires and methods related thereto.

In one aspect, the present teachings provide method of detecting a small area wildfire, the method includes: (i) obtaining, at a processor, a three-dimensional electronic map of an area of interest; (ii) receiving, at the processor from a satellite at multiple instances in time, location information for a high-altitude balloon deployed within the area of interest at a height that is more than about 40,000 feet above ground level and less that about 160,000 feet above ground level; (iii) receiving, at the processor at each instance in time, sensor attitude of one of one or more of the sensors, wherein the sensor attitude includes pitch, roll, and yaw; (iv) assigning, using the processor at each instance of time, to a plurality of pixels one or more different types of electromagnetic radiation data that is received from one or more different types of sensors on the high-altitude balloon, each sensor having a sensor field of view angle and a sensor pixel resolution, wherein one or more different types of electromagnetic radiation data represent a measurement of one or more total emitted radiance for a particular wavelength band; (v) generating, at each instance in time and using different types of sensor data for the plurality of the pixels, one or more electronic pixelated arrays of at least a portion of the area of interest; (vi) identifying, using the processor at each instance in time, pixels that are deemed to exceed a predetermined value above a moving mean as fire pixels which corresponds to small area wildfires, wherein the moving mean is a mean of all electromagnetic radiation data that was received from one or more different types of sensors during a preceding time window; (vii) computing, using fire pixels, the sensor attitude, the sensor field of view angle, the sensor pixel resolution of one or more of the sensors and the three-dimensional electronic map, fire location coordinates that define a boundary of each of the small area wildfires within at least a portion of the location of interest and/or a centroid fire location coordinate of each small area wildfires within at least a portion of the location of interest; (viii) imbedding the fire location coordinates and/or the centroid fire location coordinate that define of each of the small area wildfires on the electronic map to produce a fire activity map; and (ix) transmitting the fire activity map to one or more parties of interest in the locations of the small area wildfire.

In one embodiment to the present teachings the electronic map includes at least one map feature selected from a group including infrastructure, waterways, bodies of water, roadways, contour lines, elevation, one or more property boundaries, and one or more party of interest jurisdiction boundaries. Moreover, the electronic map of the area of interest may be received from memory, from a third party, and/or generated using data received from one or more of the sensors on the high-altitude balloon.

The method of detecting a small area wildfire, in one embodiment of the present teachings, step (vii) includes: (a) ascertaining, based on the location information and sensor attitude, a global sensor pointing reference angles that includes an X reference angle value, Y reference angle value, and Z reference angle value relative to a global reference frame; (b) determining, using the sensor field of view angle and the sensor pixel resolution of one or more of the sensors, one or more local fire pixel reference angles that includes an x reference angle value and y reference angle value relative a local sensor reference frame; (c) adding one or more of the local fire pixel reference angles to the sensor pointing reference angles to produce global fire pixel reference angles relative to the global reference frame; (d) determining, using the global fire pixel reference angles, a global fire pixel reference x-coordinate and a global fire pixel reference y-coordinate along the global fire pixel reference; (e) identifying, using the global fire pixel reference x-coordinate and/or the global fire pixel reference y-coordinate, a global fire pixel reference z-coordinate; and (t) iteratively computing the global fire pixel reference z-coordinate until the global fire pixel reference z-coordinate is relatively equal to an electronic map z-coordinate having the same x and y coordinates to determine a boundary coordinate for each of the small area wildfires and/or the centroid fire location of each of the small area wildfires.

In one embodiment of the present teaching, detecting the small area wildfire further includes identifying, based on each of the wildfire locations and one more of the parties of interest jurisdiction boundaries, one or more of the parties of interest responsible for responding to each of the small area wildfires.

In another embodiment of the present teaching, detecting the small area wildfire further includes ascertaining, based on one or more of the property boundaries and each of the small area wildfire locations, a property owner on which each of the small area wildfire locations is located and identifying, based on the property owner, one or more of the parties of interest responsible for responding to the small area wildfire on the property of the property owner. If, however, the wildfire location is adjacent to one or more of the property boundaries, the transmitting further comprises transmitting the fire activity map to one or more the parties of interest responsible for responding to the small area wildfire on the adjacent property.

In yet another embodiment of the present teaching, detecting the small area wildfire further includes: (a) determining, based on one or more of the electronic pixelated images, for at least one of the small area wildfire locations at least one wildfire characteristic selected from a group comprising a time of ignition of the small area wildfire, size of the small area wildfire, rate of growth of the small area wildfire, and direction of growth of the small area wildfire; (b) evaluating at least one of the map features proximate to at least one of the wildfire locations; (c) receiving, for each of the parties of interest, at least one firefighting attribute for responding to the small area wildfire, wherein at least one of the firefighting attribute is selected from a group comprising hand crew, number of persons within the hand crew, smoke jumping crew, number of persons within the smoke jumping crew, helicopter, fire engine, crew transport vehicle, bulldozer, masticator, tractor plow, water tender, and air tanker; (d) determining, based on at least one of the wildfire characteristics, the wildfire location, one or more firefighting attributes of each of the parties of interest, and/or at least one of the map features proximate to at least one of wildfire locations, one or more of the parties of interest that is capable of responding to at least one of the wildfire location; and (e) transmitting, along with the wildfire location, at least one of the fire characteristics to one or more of the wildfire agencies that is capable of responding to the wildfire location.

In yet another embodiment of the present teaching, detecting the small area wildfire further includes: (a) determining a size of each small area wildfire; (b) ascertaining, based on the size of each small area wildfire and the wildfire location, one or more parties of interest capable of responding to the small area wildfire; (c) calculating, based on a location of each of the parties of interest, a response time for each of the parties of interest to reach the wildfire location; and (d) identifying the party of interest with the shortest response time.

The method of detecting the small area wildfire, in yet embodiment of the present teaching, further includes determining if a distance between the wildfire location and one or more of the infrastructure and transmitting, if the distance between the wildfire location and one or more of the infrastructure is less than a predetermined distance, the fire location to the owner of the infrastructure.

In one implementation of the present teachings, the method of detecting a small area wildfire further includes: (a) receiving and/or determining near a wildfire location at least one type of wildfire growth factors selected from a group comprising topography of land surrounding the wildfire location, vegetation type and density, moisture content of the ground and/or vegetation, previous wildfire perimeters, atmospheric pressure, temperature, humidity, wind speed, wind direction, weather forecast, roads and highways, proximity to homes, towns, cities, and infrastructure, and population density; (b) determining, based on one or more of the wildfire growth factors and each of the wildfire locations, one or more risk level zones that extend from each of the small area wildfire locations; and (c) transmitting, based on the risk level zone, to one or more cellular devices at least one wildfire warning update selected from a group comprising the existence of the small area wildfire, wildfire coordinates, the risk level zone in which each individual is located, where to evacuate, one or more evacuation paths, and when to evacuate.

In one implementation of the present teachings, the method of detecting a small area wildfire transmitting includes transmitting, from the high-altitude balloon to a land-based cellular network and/or transmitting, from the high-altitude balloon to one or more cellular devices. Preferably, one or more of the risk level zones are updated in real-time.

Another optional step is (d) calculating, based on one or more of the wildfire growth factors and the wildfire location, a wildfire growth pattern; and (e) updating, based on the wildfire growth pattern, the risk zone levels for each of the wildfire locations.

In another aspect, the present teachings provide a method of detecting a small area wildfire, the method includes: (i) receiving, at a processor, an electronic map of an area of interest; receiving, at the processor from a satellite, location information for a high-altitude balloon deployed within the area of interest; (ii) determining, using the processor and based one or more different types of sensor data that is received from one or more different types of sensors on the high-altitude balloon and the high-altitude balloon location, one or more wildfire locations; (iii) embedding each of the wildfire locations on the electronic map to produce a fire activity map; and (iv) causing to display or displaying the fire activity map including the wildfire locations within the area of interest.

The method of detecting a small area wildfire, in one embodiment of the present teachings, further includes (v) determining, using the processor and based on one or more of the different types of sensor data, at least one wildfire characteristic selected from a group comprising a time of ignition of the small area wildfire, size of the small area wildfire, rate of growth of the small area wildfire, smoke thickness, smoke depth, and direction of growth of the small area; and (vi) presenting, on the fire activity map, a visual representation of at least one of the wildfire characteristics adjacent to each of the wildfire locations.

The method of detecting a small area wildfire, in another embodiment of the present teachings, further includes generating an audio and/or visual alert when at least one wildfire characteristic exceeds a predetermined threshold value.

The method of detecting a small area wildfire, in yet another embodiment of the present teachings, further includes: (a) receiving and/or determining, based on one or more of the different types of sensor data, at least one type of wildfire growth factors selected from a group comprising topography of land surrounding the wildfire location, vegetation type and density, moisture content of the ground and/or vegetation, previous wildfire perimeters, atmospheric pressure, temperature, humidity, wind speed, wind direction, weather forecast, roads and highways, proximity to homes, towns, cities, and infrastructure, and population density; and (b) presenting, on the fire activity map, a visual representation of at least one of the wildfire characteristics adjacent to one or more of the wildfire locations.

The method of detecting a small area wildfire, in another embodiment of the present teachings, further includes: (a) calculating, based on one or more of the wildfire locations, at least one wildfire characteristic and/or at least one wildfire growth factor, a wildfire growth pattern for at least one of the small area wildfires that may endanger critical land, infrastructure, and/or human life; (b) generating an audio and/or visual alert when the wildfire growth pattern exceeds a predetermined wildfire growth pattern criteria.

The method of detecting a small area wildfire, in another embodiment of the present teachings, further includes: (a) receiving and/or determining, based one or more of the different types of sensor data, one or more firefighting attributes that is responding to the small area wildfire, wherein at least one firefighting attribute is selected from a group comprising hand crew, number of persons within the hand crew, smoke jumping crew, number of persons within the smoke jumping crew, helicopter, fire engine, crew transport vehicle, bulldozer, masticator, tractor plow, water tender, and air tanker; (b) presenting, on the fire activity map, a real-time visual representation of one or more of the firefighting attributes; (c) identifying, based on one or more of the firefighting attributes and/or one or more of the different types of sensor data, one or more wildfire suppression activities that is selected from a group comprising firebreak, vegetation clearing, back burns and water and/or fire retardant drops; and (d) presenting, on the fire activity map, a visual representation of one or more of the wildfire suppression activities.

In another aspect, the present arrangements provide a wildfire detection and monitoring system including: (i) a high-altitude balloon deployed over an area of interest; (ii) a global positioning system ("GPS") receiver, coupled to the high-altitude balloon, configured to obtain high-altitude balloon location information; (iii) one or more sensors, coupled to the high-altitude balloon, configured to obtain one or more images; (iv) memory for storing an electronic map of the area of interest that includes one or more property boundaries and a landowner of each property within one or more of the property boundaries; (v) one or more processors, communicatively coupled to the GPS receiver and one or more of the sensors, one or more of the processors operative to perform the following instructions: (a) receiving, from a global positioning system ("GPS") receiver, high-altitude balloon location information; (b) receiving an electronic map of an area of interest, wherein the electronic map includes at least one map attribute selected from a group comprising, infrastructure, waterways, bodies of water, roadways, contour lines, (c) determining, from one or more of sensors on a high-altitude balloon and the high-altitude balloon location, one or more wildfire locations; and (d) embedding each of the wildfire locations on the electronic map to produce a fire activity map; (vi) a communication transmitter, coupled to the processor, for transmitting the fire activity map to at least one party of interest responsible for responding to the wildfire.

In one embodiment of the present arrangements, the high-altitude balloon is geostationary. In another embodiment of the present arrangements is deployed for a period that ranges from between about 100 days and 200 days. In yet another embodiment of the present arrangements, the high-altitude balloon is deployed at an altitude that ranges from between about 59,000 feet and about 121,000 feet above sea level. Preferably, each sensor pixel captures an area of interest of about two meters.

One or more of the sensors, in one embodiment of the present arrangements, is selected from a group comprising an Infrared and Near Infrared MODIS (Moderate Resolution Imaging Spectroradiometer) sensor, AVHRR (Advanced Very High Resolution Radiometer) sensor, VIIRS (Visible Infrared Imaging Radiometer Suite) sensor, Spinning Enhanced Visible and InfraRed Imager (SEVIRI), $CO^2$ sensor, RADAR, LIDAR, Synthetic Aperture Radar, and high definition camera.

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

Figure 1:
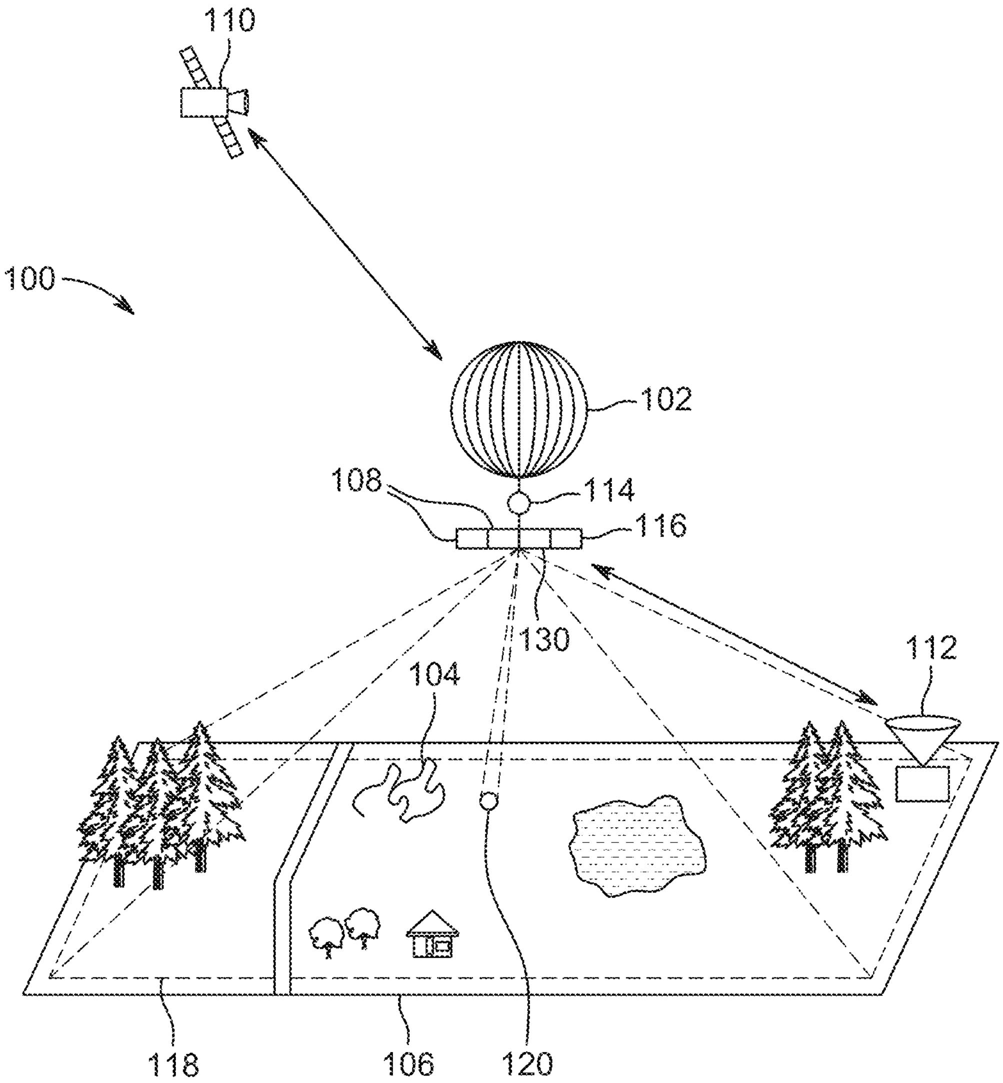
FIG. 1 shows a small area wildfire detection system, according to one embodiment of the present arrangements and that includes a high-altitude balloon deployed over an area of interest and one or more sensors located on the high-altitude balloon for capturing data relating to the area of interest.

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Every year, thousands of wildfires (e.g., forest fires, grass fires) across the globe cause large scale harm to both ecological and human-made communities. These uncontrolled wildfires cause tragic loss of life and destroy valuable natural resources and properties, including thousands of miles of forest and man-made infrastructure. To this end, local, state, and federal entities must pay for and utilize extensive resources to combat wildfires, control wildfires, and protect these natural resources and properties. Moreover, wildfires result in a devastating loss and irreparable damage to environment habitat, the atmosphere (e.g., carbon dioxide (CO2) in the emissions from the forest fires) and local communities impacted by the fire. Among other terrible consequences of forest fires are long-term disastrous effects such as impacts on local weather patterns, global warming, and extinction of rare species of the flora and fauna.

The present systems and methods provide an inexpensive and cost-effective approach for small area wildfire detection and monitoring within an area of interest using one or more high-altitude balloons. These systems and methods provide a valuable tool for one or more parties of interest to identify and, if needed, suppress the small area wildfires before they grow into bigger and more intense wildfires. A small area wildfire, by way of example, ranges in size between about 2 feet to 100 feet in length and between about 2 feet and three 100 feet in width. To detect the small area wildfire, the present arrangements and methods use a high-altitude balloon deployed above the area of interest that continuously monitors, in real-time or near real-time, the area of interest for an extended period of time. One or more sensors, coupled to the high-altitude balloon, are capable of capturing data that is used for detecting a small area wildfire.

Conventional wildfire detection practices, however, are inadequate for early detection and monitoring of a small area wildfire. By way of example, satellites and airplanes used to monitor land for wildfires are unreliable, costly, and technically deficient.

National Oceanic and Atmospheric Administration ("NOAA") operates Geostationary Operational Environmental satellites ("GOES"), for example, that routinely image the Northern Hemisphere every 15-30 minutes. Given the right wildfire conditions, this delay, while seemingly short, can allow small area wildfires to grow exponentially. Moreover, the images provided by GOES satellites have a relatively coarse spatial resolution. For example, one GOES thermal infrared pixel in the western United States spans about 375 meters. As a result, a small area wildfire occupies only a tiny fraction of a pixel, which often makes it difficult to automatically discern ignitions from natural temperature changes. To make up for the deficiencies in the resolution of the satellite, image processing algorithms are relied on to detect subtle heat anomalies and first signs of change from "no-burning" to "burning". Unfortunately, these algorithms are unreliable and may miss small area wildfire ignitions and only identify a wildfire once it has grown in size.

Aerial fire detection (e.g., low altitude airplanes and sensors contained therein) is capable of monitoring a landscape for fire ignition. Unfortunately, airplanes have a finite flight time before they must return to refuel. Moreover, airplanes and their sensors, given their relatively low altitude (e.g., 10,000 feet), have a limited field of view and cannot monitor a large area of interest (e.g., California). Additionally, providing continuous monitoring over a large area of interest would be prohibitively expensive as it would require a large fleet of airplanes and personnel.

FIG. 1 shows a small area wildfire detection system 100, according to one embodiment of the present arrangements, that includes a high-altitude balloon 102 deployed above an area of interest. As will be discussed in greater detail below, high-altitude balloon 102 includes one or more sensors 108 that continuously monitor an area of interest 106 to detect one or more small area wildfires 104.

High-altitude balloon 102 may be communicatively coupled to another high-altitude balloon (not shown), one or more satellites 110, and/or a ground-based communication station 112. In one embodiment of the present arrangements, one or more satellites 110 is one or more global positioning system (GPS) satellites that provide geolocation data and time information to a GPS receiver 130 located on high-altitude balloon 102. Thus, high-altitude balloon 102 at periodic time intervals receives location information including its longitude, latitude, altitude, and time.

One or more sensors 208 may have a fixed line-of-sight directed, from the high-altitude balloon, toward the area of interest. Conversely, one or more sensors 208 may also be adjusted such that the line-of-sight changes. In a preferred embodiment of the present arrangements, a gimbal 114 is coupled to high-altitude balloon 102. One or more sensors 108 are coupled to a gimbal 114, such that one or more sensors 108 move synchronously and are co-aligned. In other words, one or more sensors 108 coupled to gimbal 114 have a similar line of sight, from high-altitude balloon 102 to area of interest 106. Gimbal 114 may be a one, two, or three-axis gimbal to enable rotation about one, two, or three axes, respectively to adjust the line-of-sight. In a preferred embodiment of the present arrangements, gimbal 114 is a three-axis gimbal to allow six degrees of freedom (i.e., pitch, yaw, and roll). Thus, a line-of-sight of one or more sensors 208 may be adjusted to obtain information on a particular portion of the area of interest.

In one embodiment of the present arrangements, GPS receiver 130 and an initial measurement unit (IMU) 116 are coupled to gimbal 114 along with one or more sensors 108. IMU 116, which includes one or more accelerometers and one or more gyroscopes, detects linear acceleration and a rate of rotation. In a preferred embodiment of the present arrangements, IMU 116 includes three accelerometers and three gyroscopes, wherein one accelerometer and one gyroscope for obtaining measurements for each axis (i.e., X, Y, and Z axis). Data from IMU 116, along with position and time data from GPS receiver 130 is used to determine a position, velocity, and/or attitude (i.e., pitch, roll, and yaw) of one or more sensors 108. In one embodiment of the present arrangements, IMU 116 and the GPS receiver 130 are combined to be a single device.

In a preferred embodiment of the present arrangements, one or more sensors 108 includes a wide-angle sensor and a reduced-angle sensor. The wide-angle sensor has a wide angle of view. Using the wide angle of view, the wide-angle sensor has a wide instantaneous field of view 120. The reduced angle sensor has a reduced angle of view that is less than the wide angle of view of the wide angle sensor. The reduced-angle sensor has a reduced instantaneous field of view 120 that is less than a wide instantaneous field of view 118. Data received from the wide-angle sensor is used in determining coordinates that define a boundary of each of the small area wildfires within at least a portion of the location of interest and/or a centroid location coordinate of each small area wildfires within at least a portion of the location of interest. Data received from the reduced-angle sensor may be used to provide more detailed and higher resolution data and/or visual images of a particular portion of the area of interest, for example, a small area wildfire location.

In one embodiment of the present arrangements, the wide-angle sensor has a wide angle of view that ranges from about 180 degrees to about 30 degrees. In a preferred embodiment of the present arrangements, the wide-angle sensor has a wide angle of view that ranges from about 140 degrees to about 100 degrees. In a more preferred embodiment of the present arrangements, the wide-angle sensor has a wide angle of view that ranges from about 110 degrees to about 70 degrees.

In one embodiment of the present arrangements, the reduced angle sensor has a reduced angle of view that ranges from about 40 degrees to about 1 degree. In a preferred embodiment of the present arrangements, the reduced angle sensor has a reduced angle of view that ranges from about 30 degrees to about 10 degrees. In a more preferred embodiment of the present arrangements, the reduced angle sensor has a reduced angle of view that ranges from about 5 degrees to about 3 degrees.

In one embodiment of the present arrangements, one or more sensors 108 has a pixel resolution that ranges between 340 pixels and 240 pixels. In a preferred embodiment of the present arrangements, one or more sensors 108 has a pixel resolution that ranges between 640 pixels and 480 pixels. In a more preferred embodiment of the present arrangements, one or more sensors 108 has a pixel resolution that ranges between 1280 pixels and 960 pixels.

In one embodiment of the present arrangements, high-altitude balloon 102 flies at an elevation or altitude that ranges from between 20,000 feet above sea level and about 160,000 feet above sea level. In a preferred embodiment of the present arrangements, high-altitude balloon 102 flies at an elevation that ranges from between 30,000 feet above sea level and about 120,000 feet above sea level. In a more preferred embodiment of the present arrangements, high-altitude balloon 102 flies at an elevation that ranges from between 50,000 feet above sea level and about 80,000 feet above sea level.

The present arrangements recognize that a size of an area of interest high-altitude balloon 102 monitors to detect a small area wildfire may vary depending on, for example, the altitude of the high-altitude balloon, sensor type, sensor size, pixel resolution, sensor pitch angle, and sensor field of view angle. In one embodiment of the present teaching, the area of interest that the high-altitude balloon monitors to detect small area wildfires ranges from about 1 square foot to about 100 square feet. In a preferred embodiment of the present teaching, the area of interest that the high-altitude balloon monitors to detect small area wildfires ranges from about 50 square feet to about 1 square foot. In a more preferred embodiment of the present teaching, the area of interest that the high-altitude balloon monitors to detect small area wildfires ranges from about 10 square feet to about 1 square foot.

Moreover, the high-altitude balloon may be deployed for an extended period of time to ensure the area of interest is continually monitored. In one embodiment of the present arrangement, the high-altitude balloon is deployed for a period of time that ranges from about 1 day to about 3 days. In a more preferred embodiment of the present arrangements, the high-altitude balloon is deployed for a period of time that ranges from about 7 days to about 30 days. In a more preferred embodiment of the present arrangements, the high-altitude balloon is deployed for a period of time that ranges from about 180 days to about 500 days.

Figure 2:
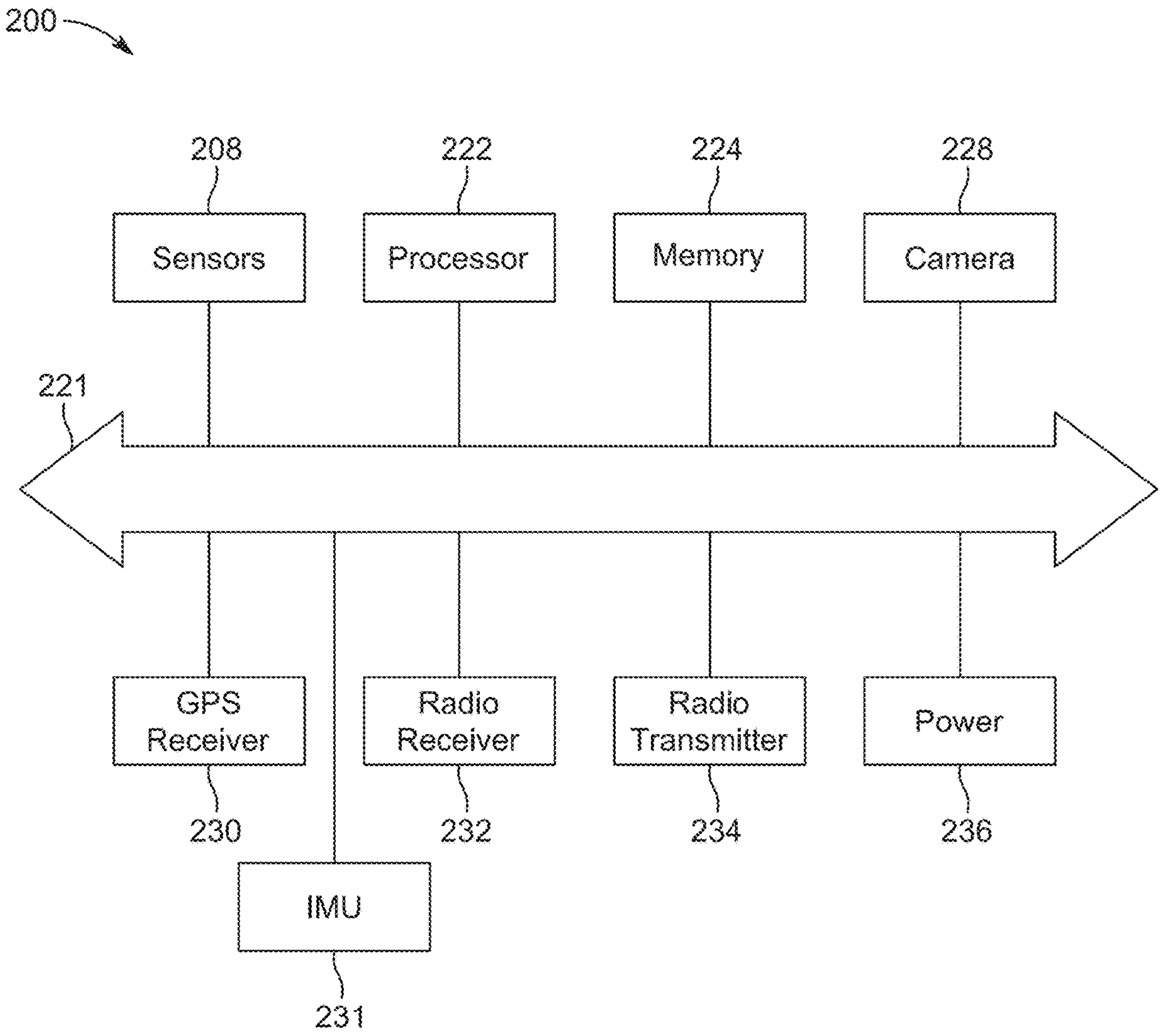
FIG. 2 shows a schematic of the small area wildfire detection system according to one embodiment of the present arrangements.

FIG. 2 shows a schematic of a small area wildfire detection system 100, in accordance with one embodiment of the present arrangements. Small area wildfire detection system 100, which is substantially similar to small area wildfire detection system 100 of FIG. 1, includes a data bus 221 that allows for communication between modules, such as a processor 222, memory 224, one or more sensors 208, camera 228, GPS receiver 230, radio receiver 232, radio transmitter 234, and power 236.

GPS receiver 230 is capable of receiving information relating to the location of core device 312 and, in certain embodiments of the present arrangements, a time e.g., time of day and date) associated with the location of the high-altitude balloon (e.g., high-altitude balloon 102 of FIG. 2). GPS receiver 230 may be programmed to retrieve the location of the high-altitude balloon contiguously or at various intervals of time. The frequency at which GPS receiver 230 receives the location of the high-altitude balloon may be adjusted based on certain parameters, for example, the accuracy of the path of the high-altitude balloon travels over a period of time. If a highly accurate path is desired, GPS receiver 230 may receive the high-altitude balloon location in short increments of time (e.g., every about 1 second to about 5 seconds). Conversely, GPS receiver 230 receives the high-altitude balloon location at greater time intervals (e.g., every about 1 minute to about 5 minutes) if high accuracy is not required or if the high-altitude balloon is moving slowly. Furthermore, the time interval may be adjusted to prevent GPS receiver 230 from draining too much power from the high-altitude balloon to ensure continuous operation.

One or more sensors 208 collect information relating to the high-altitude balloon, the environment external the high-altitude balloon, the environment between the high-altitude balloon and the earth's surface, and/or the environment of the earth's surface. One or more sensors 208 may include at least one member chosen from a group comprising Infrared and Near infrared MODIS (Moderate Resolution Imaging Spectroradiometer) sensor, AVHRR (Advanced Very High Resolution Radiometer) sensor, and/or VIIRS (Visible Infrared Imaging Radiometer Suite) sensor, CO2 sensor, RADAR, LIDAR, Synthetic Aperture Radar. In addition to one or more sensors 208, the high-altitude balloon, in one implementation of the present arrangements, includes a high-definition camera 228 for capturing still photographs and/or video.

In a preferred embodiment of the present arrangements, one or more sensors receive data within a frequency band that ranges from about 300 nanometers to about 800 nanometers, within a frequency band that ranges from about 0 micrometers to about 1.7 micrometers, and/or within a frequency band that ranges from about 8 micrometers to about 14 micrometers.

In one embodiment of the present arrangements, one or more sensors 208 collect.

Radio receiver 232 receives, at the high-altitude balloon, information from one or more satellites, another high-altitude balloon, and/or a ground-based communication station 112 (e.g., the ground-based communication station 112 of FIG. 1). By way of example, radio receiver 232 is capable of receiving information from the ground-based communication station that has been processed by one or more ground-based processors and/or servers. Additionally, radio receiver 232 may receive commands to change the operational behavior of small area wildfire detection system 100, and firmware updates intended for small area wildfire detection system 100 itself and/or sensor firmware updates.

Conversely, radio transmitter 234 transmits information, from the high-altitude balloon to another high-altitude balloon, and/or a ground-based communication station. In one embodiment of the present arrangements, radio transmitter 234 transmits all or a portion of information received from one or more sensors 208 and/or GPS receiver 230 to the ground-based communication station to be processed by one or more ground-based processors and/or servers. In one embodiment of the present arrangements, radio transmitter 234 transmits to one or more parties of interest, a fire activity map that shows the locations of one or more small area wildfires within an area of interest.

In one embodiment of the present arrangements, radio receiver 232 and radio transmitter 324 is a single component that communicates in a bidirectional manner. In one preferred embodiment of the present arrangements, radio receiver 232 and/or radio transmitter 234 is a cellular radio. In another preferred embodiment of the present arrangements, radio receiver 232 and/or radio transmitter 234 is a wireless router.

In one implementation of the present arrangements, radio transmitter 324 transmits information to one or more user devices (e.g., cellular phones). As will be described in greater detail below, the information transmitted to one or more of the user devices includes at least one wildfire warning update selected from a group comprising existence of the small area wildfire, location of the small area wildfire, risk level zone in which each user device is located, where to evacuate, one or more evacuation paths, and when to evacuate. In another embodiment of the present arrangements, radio receiver 232 and/or radio transmitter 234 is a cellular base station that provides a cellular connection to and from a mobile cellular device for communication and data transfer.

Information received from one or more sensors 208, GPS receiver 230, and radio receiver 232 may be stored in memory 224 and processed by processor 222, which may be a single processor or multiple processors. In one embodiment of the present arrangements, memory 224 includes executable software that, when executed by processor 222, produces a fire activity map that shows the locations of one or more small area wildfires within an area of interest. In another embodiment of the present arrangements, memory 224 includes executable software that, when executed by processor 222, determines one or more risk level zones that extend from each of the small area wildfire locations within an area of interest.

Memory 224 and/or processor 222 may be located on the high-altitude balloon, one or more high-altitude balloons, one or more satellites, and/or one or more ground-based computing devices or servers. The present arrangements recognize that, in one implementation, some data may be stored in memory 224 co-located with the high-altitude balloon, whereas other data is stored in memory located away from the high-altitude balloon. Likewise, some data processing may be performed by processor 222, co-located with the high-altitude balloon, whereas other data processing is performed one or more processors away from the high-altitude balloon.

Power 236 provides power to one or more sensors 208, processor 222, memory 224, camera 228, GPS receiver 230, radio receiver 232, and radio transmitter 234. Power may be provided by a battery and/or solar array.

Figure 3:
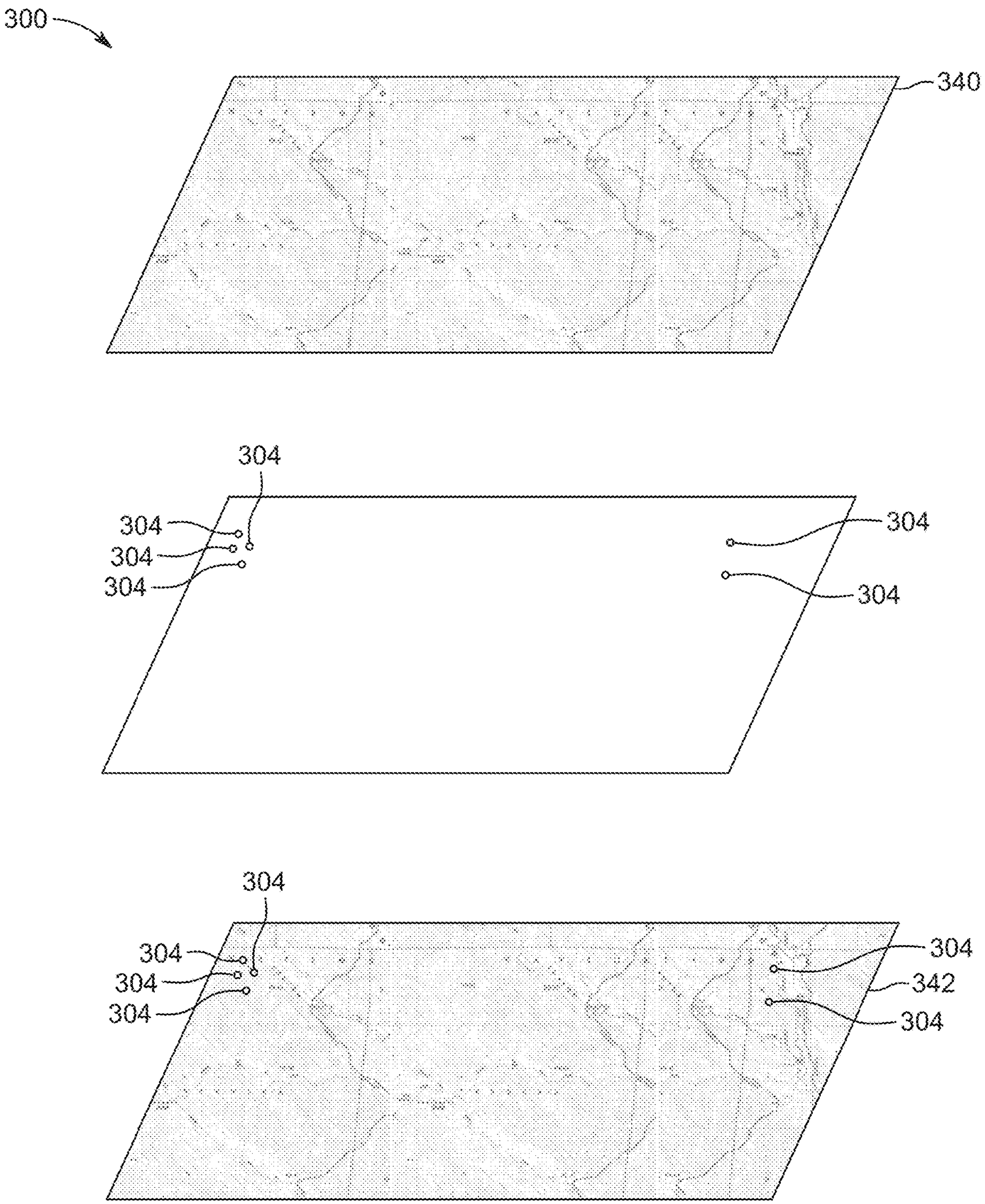
FIG. 3 shows a visual representation of a fire activity map, according to one embodiment of the present teachings, generated by a small area wildfire detection system that includes multiple small area wildfire locations.

FIG. 3 shows a visual representation of an electronic fire activity map 342, according to one embodiment of the present arrangements, generated by a small wildfire detection system 300. Small wildfire detection system 300 is substantially similar to small wildfire detection system 100 of FIG. 1. Fire activity map 342 is a combination of two information components—an electronic map 340 of an area of interest and location coordinates of one or more small area wildfires 304. Preferably, electronic map 340 is a three-dimensional map that allows for the determination of longitude, latitude, and altitude at one or more locations on electronic map 340.

Electronic map 340 may be received from memory (e.g., memory 224 of FIG. 2) on a high-altitude balloon (e.g., high-altitude balloon 102 of FIG. 1) or memory not on the high-altitude, such as from a third party (e.g., memory communicatively coupled to ground-based communication station 112 of FIG. 1). Electronic map 340 may be generated by using data from one or more of the sensors (e.g., one or more sensors 208 of FIG. 2) located on the high-altitude balloon or obtained by another entity. In one embodiment of the present teaching method 500, the electronic map includes at least one map feature selected from a group comprising infrastructure, waterways, bodies of water, roadways, contour lines, geographic features, elevation, one or more property boundaries, and one or more party of interest jurisdiction boundaries.

One or more small area wildfires 304, as will be discussed in greater detail below, are identified using sensor data from one or more of the sensors located on the high-altitude balloon. Location coordinates (i.e., longitude, latitude, and altitude) are associated with each of one or more small area wildfires 304. In one embodiment of the present arrangements, a single coordinate is associated with each small area wildfire 304. In yet another embodiment, multiple coordinates are associated with each small area wildfire, wherein each coordinate identifies a location of a portion of each small area wildfire 304. In another embodiment of the present arrangements, each small area wildfire 304 has associated therewith multiple coordinates that define a boundary of each small area wildfire 304 within the location of interest.

Figure 4:
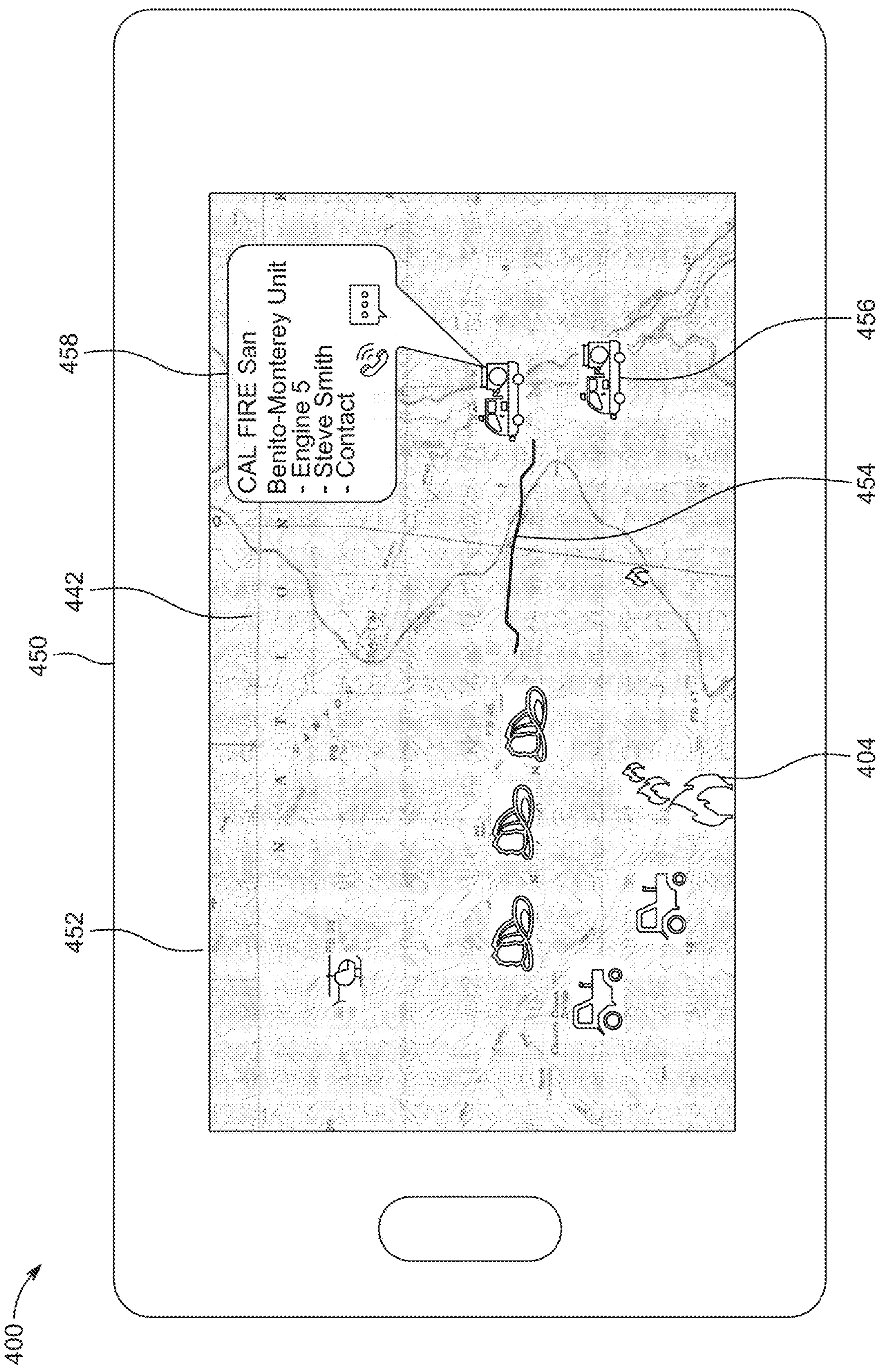
FIG. 4 shows a screenshot, according to one embodiment of the present arrangements, that include a fire activity map, locations of multiple small area wildfires, and locations of multiple firefighting attributes that have responded to the small area wildfire.

FIG. 4 shows a screenshot 400 of a user device 450, according to one embodiment of the present arrangements. User device 450 includes a touchscreen 452, which may be thought of as a combination of a display interface and an input device. User device 450 receives a fire activity map 342 from a small wildfire detection system 300 (e.g., small wildfire detection system 100 of FIG. 1), which is displayed on touchscreen 452.

Fire activity map 442, displayed on touchscreen 452, may show locations of multiple small area wildfires 404. Each small area wildfire 404 is represented by a visual icon of a flame. The size of the flame icon allows a user to ascertain the size of each small area wildfire quickly and easily. In one embodiment of the present arrangements, a user of the user device 450, may press a flame icon on touchscreen 452 to activate a pop-up menu. The pop-up menu, located adjacent to the flame icon provides at least one wildfire characteristic selected from a group comprising wildfire location e.g., coordinates), a time of ignition of the small area wildfire, size of the small area wildfire, rate of growth of the small area wildfire, smoke thickness, smoke depth, and direction of growth of the small area wildfire.

Fire activity map 442 may further display locations of multiple firefighting attributes (e.g., bulldozer, helicopter, and fire engine) 456 that have been deployed by parties of interest (e.g., local fire department, California Department of Forestry and Fire Protection ("Cal Fire"), and U.S. Forest Service). In one embodiment of the present arrangements, a user of the user device 450, may press an icon representing firefighting attribute 456, on touchscreen 452 to activate a pop-up menu 458. Pop-up menu 458, located adjacent to the firefighting attribute icon 456 provides at least one firefighting attribute selected from a group comprising firefighting attribute identifier (e.g., an entity of interest responsible for the firefighting attribute), firefighting attribute location, number of personnel at the wildfire location, length of time at the wildfire location, fire suppression task description (e.g., fire break between a first location and a second location), a person in charge of the firefighting attribute, and contact information. The user may also be able to send, through pop-up menu 458, a direct message to firefighting attribute 456 by way of electronic text message, voice message, and/or initiate direct communication via cellular network or directly via radio transmission (e.g., two-way radio devices).

In one embodiment of the present arrangements, fire activity map 442 displays locations of one or more wildfire suppression activities 454 selected from a group comprising firebreak, vegetation clearing, back burns, and water and/or fire-retardant drops. Wildfire suppression activity 454 in FIG. 4, by way of example, provides a visual representation of a firebreak along a ridge line.

Figure 5:
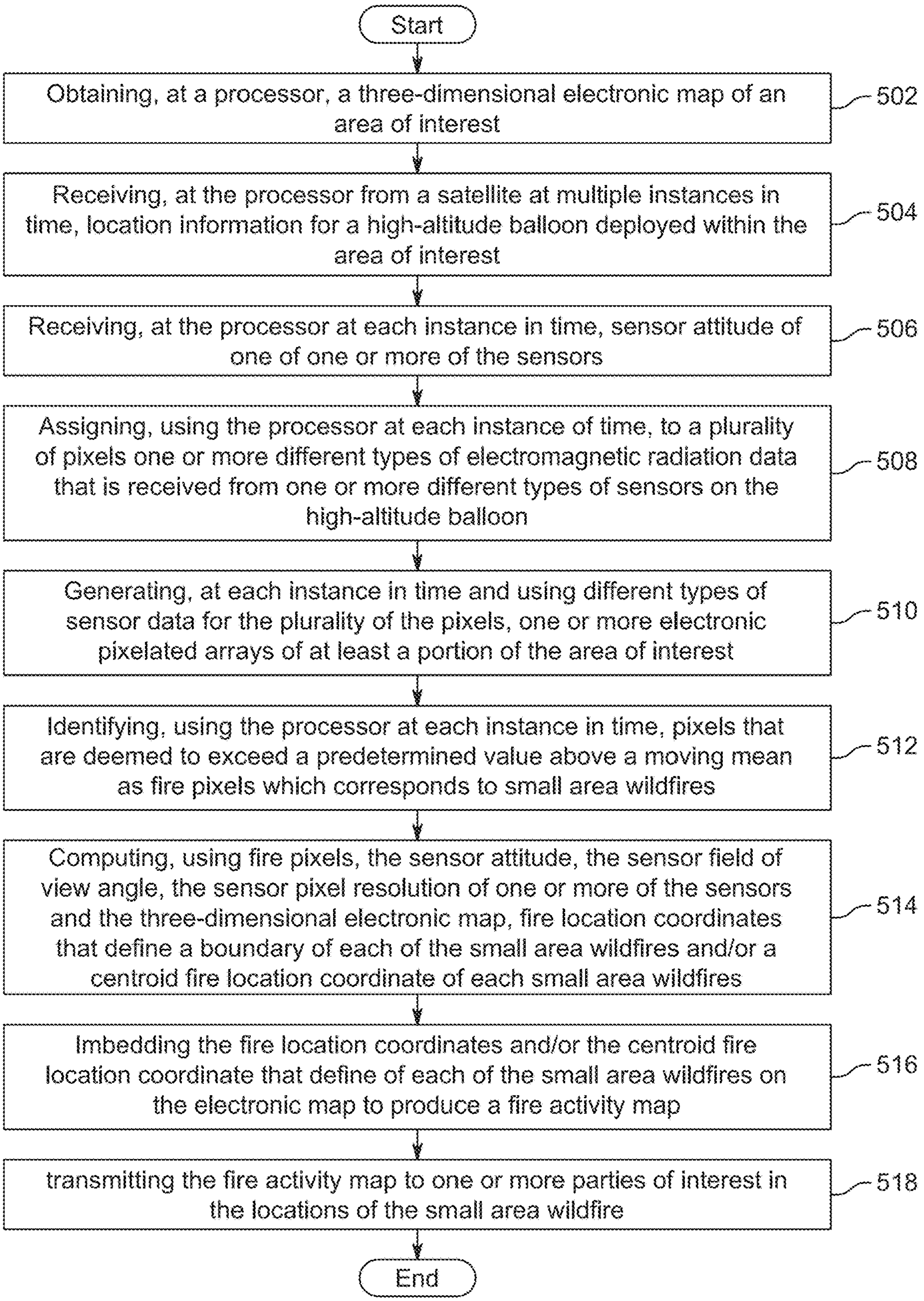
FIG. 5 shows a process flow diagram of a method detecting a small area wildfire, according to one embodiment of the present arrangements.

The present teachings offer, among other things, different methods of detecting small area wildfires. FIG. 5 shows a method of detecting a small area wildfire, according to one embodiment of the present teachings. Method 500 includes a step 502, obtaining, at a processor, a three-dimensional electronic map of an area of interest. In one embodiment of the present teachings, the electronic map is a three-dimensional elevation model. By way of example, the three-dimensional elevation model is a Shuttle Radar Topographic Mission elevation model.

Next, a step 504 includes receiving, at the processor from a satellite at multiple instances in time, location information for a high-altitude balloon deployed within the area of interest at a height that is more than about 40,000 feet above ground level and less than about 160,000 feet above ground level. Location information may include longitude, latitude, altitude, and time. The processor may receive the location information continuously or at predefined time intervals, for example, every minute.

Another step 506 includes receiving, at the processor at multiple instances in time, the sensor attitude of one or more of the sensors. In a preferred embodiment of the present teaching, an IMU (e.g., IMU 231 of FIG. 2) is collocated with one or more of the sensors, such that the MU identifies the pitch, roll, and yaw of the co-located sensors. In addition, the IMU identifies the acceleration and rate of rotation of one or more of the sensors.

Next, a step 508 is performed. Step 508 includes assigning, using the processor at each instance in time, to a plurality of pixels one or more different types of electromagnetic radiation data that is received from one or more different types of sensors on the high-altitude balloon. One or more different types of electromagnetic radiation data represent a measurement of one or more total emitted radiance for a particular wavelength band. Moreover, each sensor has a field of view angle and a pixel resolution. In one embodiment of the present teachings, electromagnetic radiation data from two different sensors are assigned to a pixel. In another embodiment of the present teachings, each pixel includes electromagnetic data for two different wavelength bands. In yet another embodiment of the present teachings, electromagnetic radiation data has a value that ranges from between about 0 and about 255. In yet another embodiment of the present, teachings, the measurement of one or more total emitted radiance for a particular wavelength band for each instance in time stored in memory (e.g., memory 224 of FIG. 2).

Following step 508, step 510 is carried out. Step 510 includes generating, at each instance in time and using different types of sensor data for the plurality of the pixels, one or more electronic pixelated arrays of at least a portion of the area of interest. The number of columns and rows of the pixel array is determined by the pixel resolution of one or more of the sensors. By way of example, if the sensor has a pixel resolution of 100×100, the array will have 100 columns and 100 rows, totaling 10,0000 pixels. In one embodiment of the present teachings, the electronic pixilated array generated at each instance in time is stored in memory.

Another step 512 includes identifying, using the processor at each instance in time, pixels that are deemed to exceed a predetermined value above a moving mean as fire pixels that correspond to small area wildfires. The moving mean is a mean of all electromagnetic radiation data that was received from one or more of the different types of sensors during a preceding time window. In one embodiment of the present teachings, at each instance in time the processor determines a mean value of all electromagnetic radiation data that was received from one or more different types of sensors during a preceding one hour time window. The time window may remain constant, throughout a twenty four hour time period or may change during the twenty four hour time period. For example, during a transition from night to day (i.e., dawn) and a transition from day to night (i.e., dusk), the time window may be reduced to ten minutes.

Yet another step 514 includes computing, using fire pixels, the sensor attitude, the sensor field of view angle, the sensor pixel resolution of one or more of the sensors, and the three-dimensional electronic map, fire location coordinates that define a boundary of each of the small area wildfires within at least a portion of the location of interest and/or a centroid fire location coordinate of each small area wildfires within at least a portion of the location of interest. Regarding fire location coordinates that define a boundary of each of the small area wildfires, each small area wildfire has associated therewith multiple coordinates that define a boundary. In particular, each location coordinate identifies a boundary between the small area wildfire and an area that is not on fire. The centroid fire location coordinate of each small area wildfire identifies a center point of a small area wildfire. The boundary or perimeter of the small area wildfire may extend way from the center point.

Yet another step 516 includes embedding the fire location coordinates and/or the centroid fire location coordinates that define each of the small area wildfires on the electronic map to produce a fire activity map. By way of example, location coordinates (e.g., longitude, latitude, and altitude) of each small area wildfire may be embedded within the electronic map. Moreover, an identifier point may be embedded in the electronic map for each small area wildfire.

As step 518 includes transmitting the fire activity map to one or more parties of interest in the locations of the small area wildfire. The fire activity may be transmitted, for example, from the high-altitude balloon located above the area of interest using a radio transmitter (e.g., radio transmitter 234 of FIG. 2), another high-altitude balloon, one or more satellites (e.g., one or more satellites 110 of FIG. 1), and/or a ground-based communication station (e.g., ground-based communication station 112).

Preferably, the fire activity map is continuously updated to provide in-real time updates. By way of example, the fire activity map is updated at 1 second, 10 second, 30 seconds, 1 minutes, 5 minutes, or 10 minute intervals. The transmitted fire activity map may be a three-dimensional map or may be converted, before transmission, into a two-dimensional map.

In one embodiment of the present teachings, one or more parties of interest are selected from a group comprising homeowner, business owner, volunteer firefighting entity, city firefighting entity, private firefighting entity, county firefighting entity, district firefighting entity, state fire firefighting entity, federal firefighting entity, sheriff, emergency dispatch, police, and federal entity.

As discussed above, the electronic map may include at least one map feature selected from a group comprising infrastructure, waterways, bodies of water, roadways, contour lines, elevation, one or more property boundaries, and one or more party of interest jurisdiction boundaries.

In one embodiment of the present teachings, step 514 further includes a step of computing, based on the location information and sensor attitude, a global sensor pointing reference angle. The global sensor pointing reference angle includes an X reference angle value, Y reference angle value, and Z reference angle value relative to a global reference frame. While not wishing to be bound by theory, the present teachings recognize that a sensor pointing reference is perpendicular to the sensor surface and extends through a center point of the sensor. The global sensor pointing reference angle may be represented by $\sigma,\theta,\alpha$, where $\sigma$ is the X reference angle, $\theta$ is the Y reference angle and, $\alpha$ is the Z reference angle.

Another step includes determining, using the sensor field of view angle and the sensor pixel resolution of one or more of the sensors, one or more local fire pixel reference angles that includes an x reference angle value and y reference angle value relative to a local sensor reference frame. Each of the local fire pixel reference angles provides a location, in a measurement of degrees, of a center point of the fire pixel relative to the sensor pointing reference that extends through the center point of the sensor.

Figure 7:
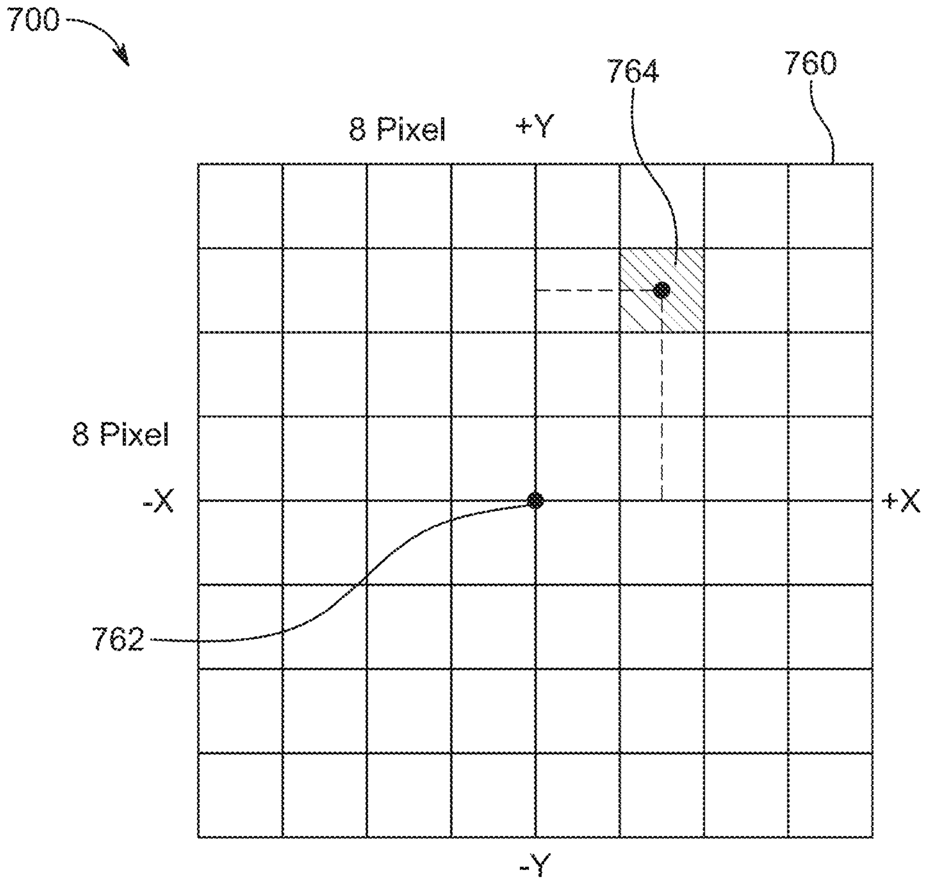
FIG. 7 shows a sensor pixel array, according to one embodiment of the present arrangements.

For illustrative purposes only, FIG. 7 shows a sensor 700 that includes multiple pixels 760, one of which is a fire pixel 764. Sensor 700 has a pixel resolution of 8×8 (i.e., 8 rows of pixels and 8 columns of pixels) totaling 64 pixels. To determine each of the local fire pixel reference angles a ratio of degrees per pixel is first calculated. This ratio is determined using the sensor field of view and the sensor pixel resolution. In this illustrative example, the sensor has a sensor field of view of 16 degrees. Thus, the ratio of degrees per pixel is 4 (i.e., 64 divided by 16 is 4). The center of each pixel, therefore, is separated by 4 degrees. Returning to FIG. 7, the center of fire pixel 764 is one and a half pixels in the x-direction and one and a half pixels in the y-direction Using this ratio, the local fire pixel reference angle in the x-direction is 6 degrees (i.e., 4 degrees for a full pixel and 2 degrees for the half pixel in the x-direction) and the local fire pixel reference angle in the y-direction is 6 degrees (i.e., 4 degrees for a full pixel and 2 degrees for the half pixel in the y-direction).

Yet another step includes adding one or more of the local fire pixel reference angles to the sensor pointing reference angles to produce global fire pixel reference angles relative to the global reference frame. This step transforms the local fire pixel reference angles, which were relative to the local sensor reference frame, to the global reference frame. Continuing the example above, 6 degrees in the x-direction and 6 degrees in the y-direction are added to the global sensor pointing reference angles to produce global fire pixel reference angles. To this end, the global fire pixel reference angles are ($\sigma$+6, $\theta$+6, $\alpha$).

Yet another step includes determining, using the global fire pixel reference angles, a global fire pixel reference x-coordinate and a global fire pixel reference y-coordinate along the global fire pixel reference. In one implementation of the present teaching, global fire pixel reference X and Y coordinates are determined by the following formulas:

$$X = c\cos\alpha;\text{ and}$$

$$Y = c\cos\alpha$$

where "c" is a length along the global fire pixel reference. The global fire pixel reference X and Y coordinates provide a location on the electronic map where the global fire pixel reference intersects at mean sea level, but not an altitude of the surface at the X, Y coordinate on the electronic map.

Yet another step includes identifying, using the global fire pixel reference x-coordinate and/or the global fire pixel reference y-coordinate, a global fire pixel reference z-coordinate. In one implementation of the present teaching, the global fire pixel reference z-coordinate for the global fire pixel reference is determined by the following formulas:

$$Z = X\tan(\sigma+6);\text{ or}$$

$$Z = Y\tan(\theta+6);$$

where "c" is the length along the global fire pixel reference.

Another step includes iteratively computing the global fire pixel reference x-coordinate, global tire pixel reference y-coordinate, and global fire pixel reference z-coordinate until the global fire pixel reference z-coordinate is relatively equal to an electronic map z-coordinate having the same x and y coordinates. When the global fire pixel reference z-coordinate is relatively equal to an electronic map z-coordinate having the same x and y coordinates to determine a boundary coordinate for each of the small area wildfires and/or the centroid fire location of each of the small area wildfires. In one embodiment of the present teachings, a global fire pixel reference z-coordinate and the electronic map z-coordinate are relatively equal when there is a difference of about 20 feet between the two coordinate values.

In one embodiment of the present teaching, method 500 further includes a step of identifying, based on each of the small area wildfire locations and one more of the parties of interest jurisdiction boundaries, one or more of the parties of interest responsible for responding to the small area wildfire. By way of example, if a small area wildfire is located within a jurisdiction boundary for Cal Fire, the fire activity map is transmitted to Cal Fire as they are at least one of the parties of interest. The same small area wildfire may also be within the jurisdiction boundary of a city fire department. Thus, the city fire department is one of the parties of interest for the small area wildfire, and the fire activity map is also transmitted to the city fire department.

In another embodiment of the present teaching, method 500 further includes optional steps of ascertaining, based on one or more of the property boundaries and each of the small area wildfire locations, a property owner on which each of the small area wildfire locations is located and identifying, based on the property owner, one or more of the parties of interest responsible for responding to the small area wildfire on the property of the property owner. By way of example, if it is ascertained that a small area wildfire is located within the property boundary of land owned by the state of California, the landowner is California. Cal Fire, which is responsible for small area wildfires on California owned land is at least one of the parties of interest. Thus, the fire activity map will be transmitted to Cal Fire.

In one implementation of the present teachings, if a small area wildfire is adjacent to and within a predetermined distance of property boundaries, one or more of the parties of interest responsible for responding to a small area wildfire on the adjacent property is also a party of interest. Thus, the fire activity map is transmitted to at least one party of interest responsible for the adjacent property. Using the same example above, if the small area wildfire on California property is within one hundred feet of a city property boundary, the city fire department is a party of interest and is transmitted the fire activity map.

Method 500, in one implementation of the present teachings, further includes an optional step of determining, based on one or more of the electronic pixilated images, for at least one of the small area wildfire locations at least one wildfire characteristic selected from a group comprising a time of ignition of the wildfire, size of the wildfire, rate of growth of the wildfire, and direction of growth of the wildfire. By way of example, the size of the small area wildfire may be identifying one or more adjacent pixels that exceed a predetermined 8-bit integer value, wherein pixels that have integer values greater than the predetermined value are classified as having a wildfire. The size of the small area wildfire may be determined by calculating an area within the grouped pixels classified as having a small area wildfire, wherein each pixel length and width is a known value.

Another optional step includes evaluating at least one of the map features proximate to at least one of the wildfire locations (e.g., roadways, geographic features, and bodies of water). Yet another step includes receiving, for each of the parties of interest, at least one firefighting attribute for responding to the small area wildfire, wherein at least one of the firefighting attributes is selected from a group comprising hand crew, number of persons within the hand crew, smoke jumping crew, number of persons within the smoke jumping crew, helicopter, fire engine, crew transport vehicle, bulldozer, masticator, tractor plow, water tender, and air tanker. The firefighting attributes may be received from memory, each party of interest, or a third party.

Following the optional receiving step, another optional step includes determining, based on at least one of the wildfire characteristics, the wildfire location, one or more firefighting attributes of each of the parties of interest, and/or at least one of the map features proximate to at least one of wildfire locations, one or more wildfire agencies that is capable of responding to at least one of the wildfire locations. By way of example, if the small area wildfire is determined to be 200 square feet but not adjacent to a road and within a steep ravine, the only parties of interest capable of responding to the small area wildfire may be parties that can have an air tanker and/or smoke jumping crew.

Yet another optional step includes, transmitting, along with the wildfire location, at least one of the fire characteristics to one or more of the wildfire agencies that is capable of responding to the wildfire location.

Method 500, in yet another embodiment of the present teachings, further includes the optional steps of determining, based on one or more of the electronic pixilated images, a size of each of the small area wildfires. By way of example, where each pixel size is known, the area of each pixel having a wildfire location is added together to determine the size of the small area wildfire.

Another optional step includes ascertaining, based on the size of each of the small area wildfires and the wildfire location, one or more parties of interest capable of responding to the wildfire. Parties of interest are selected based on the party's ability to respond to a small area wildfire of a certain size and/or a particular size. By way of example, if the small area wildfire is in a remote location, only parties of interest that can reach the remote location are ascertained.

Yet another step includes calculating, based on the location of each of the parties of interest, a response time for each of the parties of interest to reach the wildfire location. Finally, yet another optional step includes identifying the party of interest with the shortest response time.

Method 500, in yet another embodiment of the present teachings, further includes an optional step of determining, based on one or more of the electronic pixilated images, if a distance between the wildfire location and one or more of the infrastructure and another step of transmitting, if the distance between the wildfire location and one or more of the infrastructure elements is less than a predetermined distance, the small area fire location to the owner of the infrastructure. By way of example, a wildfire location is within 100 feet of an overhead powerline. This distance is less than a predetermined distance of 150 feet. Therefore, the fire location is transmitted to the owner of the overhead powerline.

Method 500 further includes methods for generating and transmitting risk zone levels. In one embodiment of the present teachings, method 500 further includes an optional step of receiving and/or determining, at each wildfire location, at least one type of wildfire growth factor selected from a group comprising topography of land surrounding the wildfire location, vegetation type and density, moisture content of the ground and/or vegetation, previous wildfire perimeters, atmospheric pressure, temperature, humidity, wind speed, wind direction, weather forecast, roads and highways, proximity to homes, towns, cities, and infrastructure, and population density. At least one of the wildfire growth factors may be received from the electronic map of the area of interest, from memory, and/or from a third party. At least one of the wildfire growth factors may also be determined by analyzing one or more of the electronic pixelated images generated from one or more of the sensors.

Another optional step includes determining, based on one or more of the wildfire growth factors and each of the wildfire locations, one or more risk level zones that extend from each of the wildfire locations. Yet another optional step includes transmitting, based on the risk level zone, at least one wildfire warning update selected from a group comprising the existence of the wildfire, location of the wildfire, the risk level zone in which each individual is located, when to evacuate, where to evacuate, and one or more evacuation paths to one or more cellular devices. At least one of the wildfire warning updates is transmitted, in one implementation of the present teachings, from a radio transmitter (e.g., radio transmitter 234 of FIG. 2) located on the high-altitude balloon to one or more cellular devices. In a preferred embodiment of the present arrangements, one or more of the risk-zone level is continuously updated to provide real-time updates.

Yet another optional step includes calculating, based on one or more of the wildfire growth factors and the wildfire location, a wildfire growth pattern and updating, based on the wildfire growth pattern, the risk zone levels for each of the wildfire locations. By way of example, using a MODIS and/or VIIRS sensor located on the high-altitude balloon, vegetation moisture content of the vegetation surrounding the small area wildfire may be determined. Wind direction may be determined, for example by using a VIIRS and/or MODIS sensor located on a balloon, by identifying aerosol optical thickness and/or aerosol optical depth, which represents smoke emanating from the small area wildfire, and a direction wind is pushing the aerosol. Using the wildfire location, vegetation moisture content of the vegetation surrounding the small area wildfire and wind direction, one or more processors calculates a wildfire growth pattern, i.e., how the small area wildfire is expected to grow. The wildfire growth pattern may be calculated for different future instances in time, for example, a wildfire growth pattern 5 minutes, 10 minutes, 30 minutes, and/or 1 hour from the current time. The risk zone levels, based on the wildfire growth patterns, are also updated at predetermined future instances in time.

Another optional step includes presenting, on the fire activity map, a real-time visual representation of one or more of the risk level zones proximate to each of the wildfire locations. Each, risk zone level, by way of example, is visually presented as a shaded region or presented as a particular color. In one implementation of the present teachings, the highest risk zone level, which is closest to the wildfire location, is presented as a color red. A medium risk zone level is presented as orange, and a low risk zone level is presented as yellow.

Figure 6:
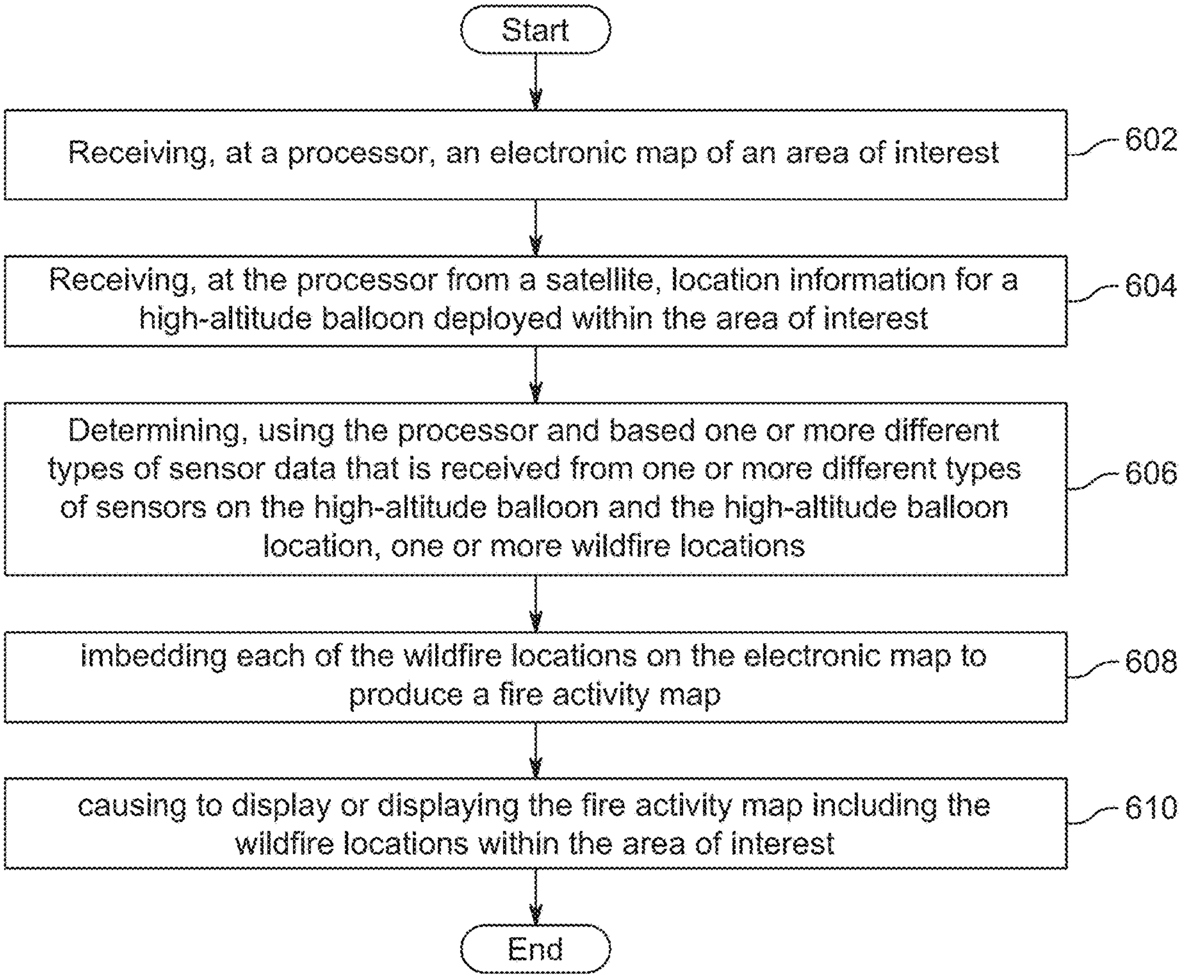
FIG. 6 shows a process flow diagram of a method of monitoring a small area wildfire, according to one embodiment of the present arrangements.

The present teachings offer, among other things, different methods of monitoring a small area wildfire. FIG. 6 shows a method of monitoring a small area wildfire, according to one embodiment of the present teachings. Method 600 includes a step 602, which includes receiving an electronic map of an area of interest. As discussed above, the electronic map may be stored in memory (e.g., memory 224 of FIG. 2) of a high-altitude balloon (e.g., high-altitude balloon 102 of FIG. 1), generated from one or more sensors (e.g., one or more sensors 108 of FIG. 1) located on the high-altitude balloon, or receive from a third party.

A step 604 includes receiving, at the processor from a satellite, location information for a high-altitude balloon deployed within the area of interest.

Another step 606 includes determining, from one or more sensors on a high-altitude balloon and the high-altitude balloon location, one or more wildfire locations.

Next, step 608 is carried out. Step 608 includes embedding each of the wildfire locations on the electronic map to produce a fire activity map.

Following step 608, a step 610 includes causing to display or displaying the fire activity map including the wildfire locations and at least one of the map features. In one implementation of the present teachings, a visual representation (e.g., an icon) is displayed at each wildfire location to represent the small area wildfire. The size of the visual representation may vary depending on the size of the small area wildfire. By way of example, a small area wildfire that covers an area of land that is less than about 20 feet squared is represented by a small icon. A small area wildfire that is between about 21 feet squared and 50 feet squared is represented by a medium sized icon, and a small area wildfire that is between about 51 feet squared and 100 feet squared is represented by a large sized icon.

In another implementation of the present teaching, the visual representation of the small area wildfire may be represented by a color, which changes depending on the size and/or the temperature of the small area wildfire. In yet another implementation of the present teachings, the visual representation is one or pixels in which the small area wildfire is located, and a color applied to that pixel that represents the size of the small area wildfire and/or the temperature of the small area wildfire.

In one embodiment of the present teachings, the method of monitoring a small area wildfire includes optional steps of determining, using the processor and based on one or more of the different types of sensor data, at least one wildfire characteristic selected from a group comprising a time of ignition of the wildfire, size of the wildfire, rate of growth of the wildfire, smoke thickness, smoke depth, and direction of growth of the wildfire and presenting, on the fire activity map, a visual representation of at least one of the wildfire characteristics adjacent to each of the wildfire locations. Another optional step includes generating an audio and/or visual alert when at least one wildfire characteristic exceeds a predetermined threshold value. By way of example, the rate of growth of the wildfire may have a predetermined threshold of 100 feet per hour. If the rate of growth of the wildfire is determined to be 250 feet per hour, an audio and/or visual alert is generated on a user device.

The method of monitoring a small area wildfire 600, in one implantation of the present teachings, includes an optional step of receiving and/or determining, using the processor and based on one or more of the different types of sensor data, at least one type of wildfire growth factors selected from a group comprising topography of land surrounding the wildfire location, vegetation type and density, moisture content of the ground and/or vegetation, previous wildfire perimeters, atmospheric pressure, temperature, humidity, wind speed, wind direction, weather forecast, roads and highways, homes, towns, cities, and infrastructure, and population density. One or more types of wildfire growth factors may be received from memory and/or from a third party (e.g., a fire department). Another optional step includes presenting, on the fire activity map, a visual representation of at least one of the wildfire characteristics adjacent to one or more of the wildfire locations. In one embodiment of the present teachings, each wildfire characteristic is visually presented as a visual icon that allows a user to identify the wildfire characteristic quickly and easily for a particular small area wildfire. In another embodiment of the present teaching, one or more wildfire characteristics are presented to a user in a pop-up menu adjacent to the visual representation of the small area wildfire. The pop-up menus are accessed when the user presses on the visual representation of the small area wildfire.

Yet another option step includes calculating, based on at least one of the wildfire locations, at least one wildfire characteristic and/or at least one wildfire growth factor, a wildfire growth pattern for at least one of the small area wildfires that may endanger critical land, infrastructure, and/or human life. Yet another option step includes generating an audio and/or visual alert when the wildfire growth pattern exceeds a predetermined wildfire growth pattern criterion.

The method of monitoring a small area wildfire 600, in one implantation of the present teachings, includes an optional step of receiving and/or determining, based on one or more of the different types of sensor data, one or more firefighting attributes that is responding to the wildfire, wherein at least one firefighting attribute is selected from a group comprising hand crew, number of persons within the hand crew, smoke jumping crew, number of persons within the smoke jumping crew, helicopter, fire engine, crew transport vehicle, bulldozer, masticator, tractor plow, water tender, and air tanker. One or more firefighting attributes may be received from memory and/or from a third party (e.g., a fire department). In one embodiment of the present teachings, the locations of air tankers and/or helicopters are received by receiving an automatic dependent surveillance-broadcast (ADS-B) associated with each air tanker or helicopter. In another embodiment of the present teachings, each firefighting attribute includes a tracking device (e.g., a GPS-enabled tracking device) and the optional receiving step includes receiving the location of each tracking device.

Another optional step includes presenting, on the fire activity map, a real-time visual representation of one or more of the firefighting attributes. In one embodiment of the present teachings, one or more of the firefighting attributes is visually presented as one or more icons, which allows a user to identify each firefighting attribute quickly and easily for a particular small area wildfire. In another embodiment of the present teaching, one or more of the firefighting attributes are presented to a user in a pop-up menu adjacent to the visual representation of the small area wildfire. The pop-up menu is accessed when the user presses on the visual representation of the small area wildfire. The pop-up menu may also provide additional information regarding each firefighting attribute such as a firefighting attribute identifier (e.g., the entity of interest responsible for the firefighting attribute), the number of personnel at the wildfire location, length of time at the wildfire location, fire suppression task description (e.g., fire break between a first location and a second location), the person in charge of the firefighting attribute, and contact information. The user may also be able to send, through the pop-up menu, a direct message to the firefighting attribute by way of electronic text message, voice message, and/or initiate a direct communication via cellular network or directly via radio transmission (e.g., two-way radio devices).

Yet another optional step includes causing to display or displaying one or more electronic pixelated images of at least a portion of the area of interest. As discussed above, the electronic pixelated image is generated using one or more of the different types of sensor data received from one or more different types of sensors on the high-altitude balloon.

Yet another optional step includes identifying, based on one or more of the firefighting attributes, one or more of the different types of sensor data, and/or one or more electronic pixelated images, one or more wildfire suppression activities that is selected from a group comprising firebreak, vegetation clearing, back burns and water and/or fire-retardant drops. By way of example, one or more water and/or retardant drops are identified by comparing an electronic pixelated image to a previously generated electronic pixilated image to identify a temperature gradient between the two images. The temperature gradient, from a high temperature to a lower temperature, results from a portion of the small area wildfire and adjacent terrain having a relatively high temperature being covered with water and/or retardant during a drop, which decreases the temperature of that drop area.

Yet another optional step includes presenting, on the fire activity map, a visual representation (e.g., an icon) of one or more of the wildfire suppression activities.

Although illustrative embodiments of this invention have been shown and described, other modifications, changes, and substitutions are intended. Accordingly, it is appropriate that the disclosure be construed broadly.

What is claimed is:

1. A method of detecting a small area wildfire, said method comprising:

obtaining, at a processor, a three-dimensional electronic map of an area of interest;

receiving, at the processor from a satellite at multiple instances in time, location information for a high-altitude balloon deployed within the area of interest at a height that is more than about 40,000 feet above ground level and less than about 160,000 feet above ground level;

receiving, at the processor at each instance in time, sensor attitude of one or more of the sensors, wherein the sensor attitude includes pitch, roll, and yaw;

assigning, using the processor at each instance of time, to a plurality of pixels one or more different types of electromagnetic radiation data that is received from one or more different types of sensors on the high-altitude balloon, each sensor having a sensor field of view angle and a sensor pixel resolution, wherein one or more different types of electromagnetic radiation data represent a measurement of one or more total emitted radiance for a particular wavelength band;

generating, at each instance in time and using different types of sensor data for the plurality of the pixels, one or more electronic pixelated arrays of at least a portion of the area of interest;

identifying, using the processor at each instance in time, pixels that are deemed to exceed a predetermined value above a moving mean as fire pixels which corresponds to small area wildfires, wherein the moving mean is a mean of all electromagnetic radiation data that was received from one or more different types of sensors during a preceding predetermined time window;

computing, using fire pixels, the sensor attitude, the sensor field of view angle, the sensor pixel resolution of one or more of the sensors, and the three-dimensional electronic map, fire location coordinates that define a boundary of each of the small area wildfires within at least a portion of the location of interest and/or a centroid fire location coordinate of each small area wildfires within at least a portion of the location of interest;

embedding the fire location coordinates and/or the centroid fire location coordinates that define each of the small area wildfires on the electronic map to produce a fire activity map; and transmitting the fire activity map to one or more parties of interest in the locations of the small area wildfire.

2. The method of detecting a small area wildfire of claim 1, wherein the electronic map includes at least one map feature selected from a group comprising infrastructure, waterways, bodies of water, roadways, contour lines, elevation, one or more property boundaries, and one or more party of interest jurisdiction boundaries.

3. The method of detecting a small area wildfire of claim 1, wherein the electronic map of the area of interest is received from memory, from a third party, and/or generated using data received from one or more of the sensors on the high-altitude balloon.

4. The method of detecting a small area wildfire of claim 1, wherein the computing further comprises:

ascertaining, based on the location information and sensor attitude, a global sensor pointing reference angles that includes an X reference angle value, Y reference angle value, and Z reference angle value relative to a global reference frame;

determining, using the sensor field of view angle and the sensor pixel resolution of one or more of the sensors, one or more local fire pixel reference angles that includes an x reference angle value and y reference angle value relative to a local sensor reference frame;

adding one or more of the local fire pixel reference angles to the sensor pointing reference angles to produce global fire pixel reference angles relative to the global reference frame;

determining, using the global fire pixel reference angles, a global fire pixel reference x-coordinate and a global fire pixel reference y-coordinate along the global fire pixel reference;

identifying, using the global fire pixel reference x-coordinate and/or the global fire pixel reference y-coordinate, a global fire pixel reference z-coordinate; and iteratively computing the global fire pixel reference z-coordinate until the global fire pixel reference z-coordinate is relatively equal to an electronic map z-coordinate having the same x and y coordinates to determine a boundary coordinate for each of the small area wildfires and/or the centroid fire location of each of the small area wildfires.

5. The method of detecting a small area wildfire of claim 1, wherein the high-altitude balloon location information includes latitude, latitude, altitude, and time.

6. The method of detecting a small area wildfire of claim 2, further comprising:

identifying, based on each of the wildfire locations and one more of the parties of interest jurisdiction boundaries, one or more of the parties of interest responsible for responding to each of the small area wildfires.

7. The method of detecting a small area wildfire of claim 2, further comprising:

ascertaining, based on one or more of the property boundaries and each of the small area wildfire locations, a property owner on which each of the small area wildfire locations is located; and identifying, based on the property owner, one or more of the parties of interest responsible for responding to the small area wildfire on the property of the property owner.

8. The method of detecting a small area wildfire of claim 7, wherein, if the wildfire location is adjacent to one or more of the property boundaries, the transmitting further comprises transmitting the fire activity map to one or more of the parties of interest responsible for responding to the small area wildfire on the adjacent property.

9. The method of detecting a small area wildfire of claim 2, further comprising:

determining, based on one or more of the electronic pixelated images, for at least one of the small area wildfire locations at least one wildfire characteristic selected from a group comprising a time of ignition of the small area wildfire, size of the small area wildfire, rate of growth of the small area wildfire, and direction of growth of the small area wildfire;

evaluating at least one of the map features proximate to at least one of the wildfire locations;

receiving, for each of the parties of interest, at least one firefighting attribute for responding to the small area wildfire, wherein at least one of the firefighting attributes is selected from a group comprising hand crew, number of persons within the hand crew, smoke jumping crew, number of persons within the smoke jumping crew, helicopter, fire engine, crew transport vehicle, bulldozer, masticator, tractor plow, water tender, and air tanker;

determining, based on at least one of the wildfire characteristics, the wildfire location, one or more firefighting attributes of each of the parties of interest, and/or at least one of the map features proximate to at least one of the wildfire locations, one or more of the parties of interest that is capable of responding to at least one of the wildfire location; and transmitting, along with the wildfire location, at least one of the fire characteristics to one or more of the wildfire agencies that is capable of responding to the wildfire location.

10. The method of detecting a small area wildfire of claim 1, further comprising:

determining a size of each small area wildfire;

ascertaining, based on the size of each small area wildfire and the wildfire location, one or more parties of interest capable of responding to the small area wildfire;

calculating, based on a location of each of the parties of interest, a response time for each of the parties of interest to reach the wildfire location; and identifying the party of interest with the shortest response time.

11. The method of detecting a small area wildfire of claim 2, further comprising determining if a distance between the wildfire location and one or more of the infrastructure; and transmitting, if the distance between the wildfire location and one or more of the infrastructure is less than a predetermined distance, the fire location to the owner of the infrastructure.

12. The method of detecting a small area wildfire of claim 1, further comprising:

receiving and/or determining near a wildfire location at least one type of wildfire growth factors selected from a group comprising topography of land surrounding the wildfire location, vegetation type and density, moisture content of the ground and/or vegetation, previous wildfire perimeters, atmospheric pressure, temperature, humidity, wind speed, wind direction, weather forecast, roads and highways, proximity to homes, towns, cities, and infrastructure, and population density;

determining, based on one or more of the wildfire growth factors and each of the wildfire locations, one or more risk level zones that extend from each of the small area wildfire locations;

transmitting, based on the risk level zone, to one or more cellular devices at least one wildfire warning update selected from a group comprising the existence of the small area wildfire, wildfire coordinates, the risk level zone in which each individual is located, where to evacuate, one or more evacuation paths, and when to evacuate.

13. The method of detecting a small area wildfire of claim 12, wherein the transmitting includes transmitting, from the high-altitude balloon to a land-based cellular network and/or transmitting, from the high-altitude balloon to one or more cellular devices.

14. The method of detecting a small area wildfire of claim 12, the determining further comprises:

calculating, based on one or more of the wildfire growth factors and the wildfire location, a wildfire growth pattern; and updating, based on the wildfire growth pattern, the risk zone levels for each of the wildfire locations.

* * * * *